US011917941B2

(12) United States Patent
Asebedo et al.

(10) Patent No.: US 11,917,941 B2
(45) Date of Patent: Mar. 5, 2024

(54) ENHANCEMENT OF COMBINE HARVESTER YIELD DATA THROUGH AUGMENTATION WITH SPATIAL GRAIN CART DATA

(71) Applicant: Topcon Positioning Systems, Inc., Livermore, CA (US)

(72) Inventors: Antonio R. Asebedo, Manhattan, KS (US); Jared Ochs, Kansas City, KS (US); Brian Sorbe, Edgerton, WI (US)

(73) Assignee: Topcon Positioning Systems, Inc., Livermore, CA (US)

( * ) Notice: Subject to any disclaimer, the term of this patent is extended or adjusted under 35 U.S.C. 154(b) by 276 days.

(21) Appl. No.: 16/999,009

(22) Filed: Aug. 20, 2020

(65) Prior Publication Data

US 2021/0051849 A1    Feb. 25, 2021

Related U.S. Application Data

(60) Provisional application No. 62/890,688, filed on Aug. 23, 2019.

(51) Int. Cl.
*A01D 41/127*    (2006.01)
*A01D 41/12*    (2006.01)

(52) U.S. Cl.
CPC ..... *A01D 41/1272* (2013.01); *A01D 41/1217* (2013.01); *A01D 41/1275* (2013.01)

(58) Field of Classification Search
CPC ............ A01D 41/1272; A01D 41/1275; A01D 41/1217; A01B 79/005
See application file for complete search history.

(56) References Cited

U.S. PATENT DOCUMENTS

| | | | |
|---|---|---|---|
| 6,687,616 B1 | 2/2004 | Peterson et al. | |
| 6,820,459 B2 | 11/2004 | Beck et al. | |
| 7,073,314 B2 | 7/2006 | Beck et al. | |
| 7,257,503 B1* | 8/2007 | Anderson | A01D 41/1277 56/10.2 H |

(Continued)

FOREIGN PATENT DOCUMENTS

WO    2015048499 A1    4/2015

OTHER PUBLICATIONS

International Search Report and Written Opinion dated Nov. 23, 2020, in connection with International Patent Application No. PCT/US2020/047277, filed Aug. 20, 2020, 10 pgs.

*Primary Examiner* — Alicia Torres
(74) *Attorney, Agent, or Firm* — Chiesa Shahinian & Giantomasi PC (57) ABSTRACT

A method for processing harvest yield data includes the steps of receiving load data from a grain cart and receiving harvest yield data from a combine harvester. The load data and harvest yield data are post-processed to generate enhanced harvest yield data. The combine harvester and the grain cart can operate in an on-the-go unloading harvest operation or a stationary unloading harvest operation. Post-processing can include creating a field boundary for a harvest area, determining a start time and start position for the combine harvester within the field boundary, and determining an end time and end position for the combine harvester within the field boundary. The total grain yield weight estimated by a yield monitor can be calibrated to match the grain cart total scale weight.

17 Claims, 10 Drawing Sheets

(56) References Cited

U.S. PATENT DOCUMENTS

| | | | |
|---|---|---|---|
| 7,650,734 B2 | 1/2010 | Beck et al. | |
| 10,317,272 B2* | 6/2019 | Bhavsar | G01G 23/01 |
| 10,677,637 B1* | 6/2020 | Von Muenster | A01D 41/1272 |
| 2007/0050116 A1* | 3/2007 | Jernigan | A01D 46/243 |
| | | | 701/50 |
| 2011/0213531 A1 | 9/2011 | Farley et al. | |
| 2013/0124239 A1 | 5/2013 | Rosa et al. | |
| 2014/0311113 A1* | 10/2014 | Bonefas | A01D 75/02 |
| | | | 56/10.2 R |
| 2014/0358466 A1 | 12/2014 | Foster et al. | |
| 2016/0330906 A1* | 11/2016 | Acheson | A01D 41/127 |
| 2016/0345485 A1* | 12/2016 | Acheson | G01D 18/00 |
| 2018/0122020 A1* | 5/2018 | Blank | A01D 41/127 |
| 2018/0132419 A1* | 5/2018 | Ueda | A01D 41/1272 |
| 2020/0154639 A1* | 5/2020 | Takahara | G06Q 50/02 |

\* cited by examiner

ENHANCEMENT OF COMBINE HARVESTER YIELD DATA THROUGH AUGMENTATION WITH SPATIAL GRAIN CART DATA

CROSS-REFERENCE TO RELATED APPLICATIONS

This application claims the benefit of prior-filed U.S. Provisional Application No. 62/890,688 filed Aug. 23, 2019, the disclosure of which is incorporated herein by reference in its entirety.

FIELD OF THE INVENTION

The present disclosure relates generally to data acquisition, and more particularly to enhancement of harvester grain yield data.

BACKGROUND

In agriculture production systems, grain yield is recorded through combine harvester yield monitors and scales positioned on grain carts and grain elevators. Yield monitoring allows modification to the production management of how crops are planted and treated in a particular field. For example, in areas of the field where yield is low, action can be taken to increase the yield of those areas. In areas where yield is high, the same actions previously performed can be performed for another planting. In recent history, combine harvester yield monitor data has provided the best granularity of in-field variability related to crop yield performance. However, combine yield data is commonly considered to be too inaccurate and too unreliable to singularly contribute to crop insurance reporting and agronomic management. This is primarily due to the difficulty and inconvenience of maintaining accurate yield monitor system calibration processes during combine operations.

Therefore, equipment utilizing true weight scales such as grain carts and truck scales are generally considered the primary source for obtaining accurate yield information for farms. However, current grain cart technology only allows for low resolution yield values spanning large sections of fields or even entire fields and lacks the spatial granularity to identify in-field variability related to crop yield performance that combine harvester yield monitor systems currently provide. Many efforts have been made to improve combine yield monitor system calibrations and mass flow sensing in order to improve reliability and accuracy, but they have not been considered a replacement for obtaining true grain weight through scale systems.

SUMMARY

In one embodiment, a method for processing harvest yield data includes the steps of receiving load data from a grain cart and receiving harvest yield data from a combine harvester. The load data and harvest yield data are post-processed to generate enhanced harvest yield data. The combine harvester and the grain cart can operate in an on-the-go unloading harvest operation or a stationary unloading harvest operation. Post-processing can include creating a field boundary for a harvest area, determining a start time and start position for the combine harvester within the field boundary, and determining an end time and end position for the combine harvester within the field boundary. The post-processing can also include calculating a total grain yield weight estimated by a yield monitor of the combine harvester and calculating a total grain yield weight estimated by the grain cart total scale weight. The total grain yield weight estimated by a yield monitor can be calibrated to match the grain cart total scale weight.

DETAILED DESCRIPTION

Figure 1:
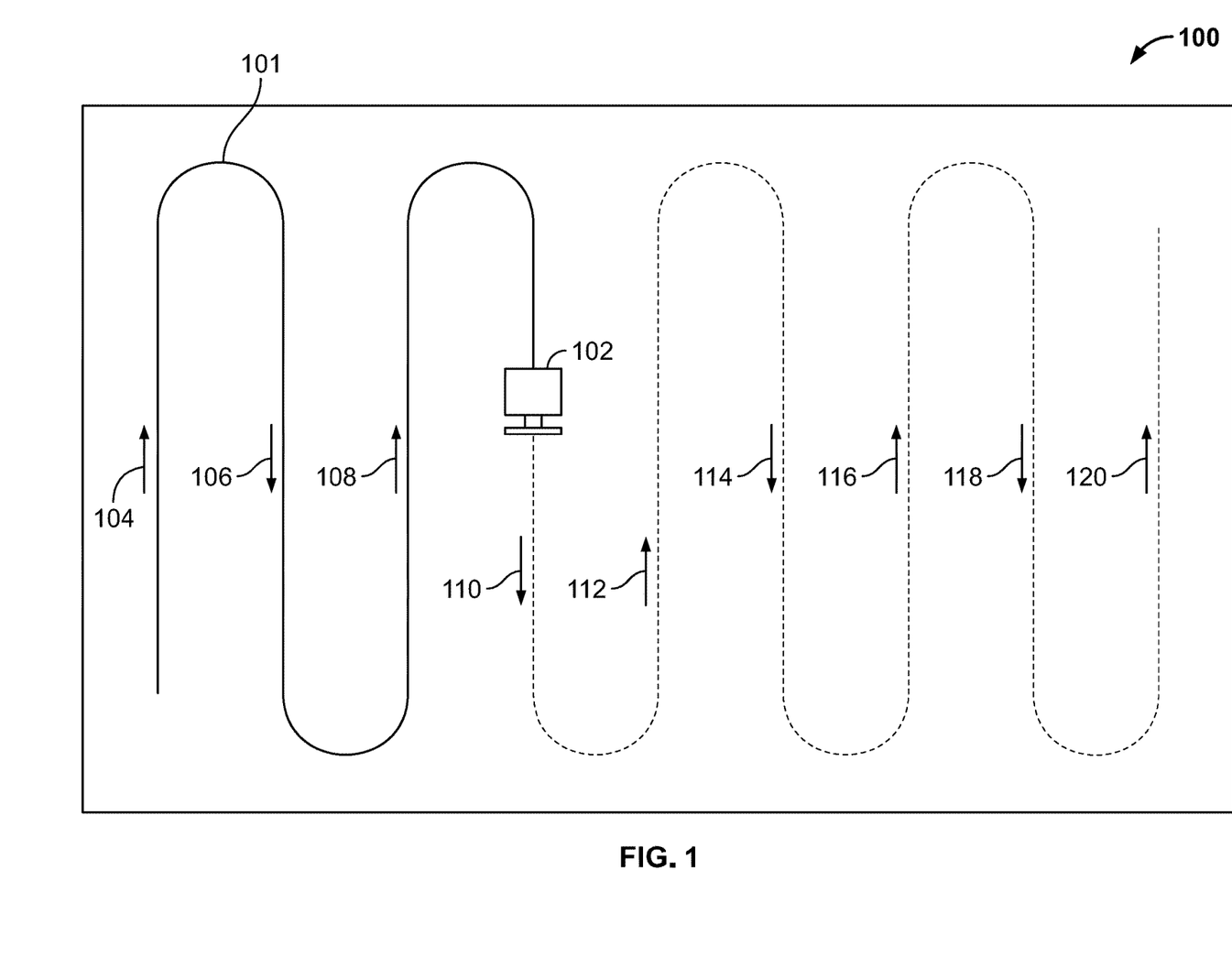
FIG. 1 shows a combine harvester harvesting a crop from a field.

FIG. 1 shows a field 100 in which a crop is growing. Combine harvester 102 (also referred to as combine) is shown traversing field 100 in alternating directions via path 101. Specifically, combine 102 is shown travelling in a first direction indicated by arrow 104 toward an end of field 100 and then turning near the end of field 100 and travelling in a second direction indicated by arrow 106. Combine 102 continues traversing field 100 via path 101 in alternating directions as indicated by arrows 110, 112, 114, 116, 118, and 120. As combine 102 traverses field 100, it harvests the crop located in field 100. In one embodiment, the harvested material is grain and combine 102 must periodically unload the grain that it has harvested because the combine has a limited grain storage capacity. The portion of path 101 already traversed by combine 102 is shown as a sold line and the portion of path 101 yet to be traversed by combine 102 is shown as a dashed line.

Figure 2:
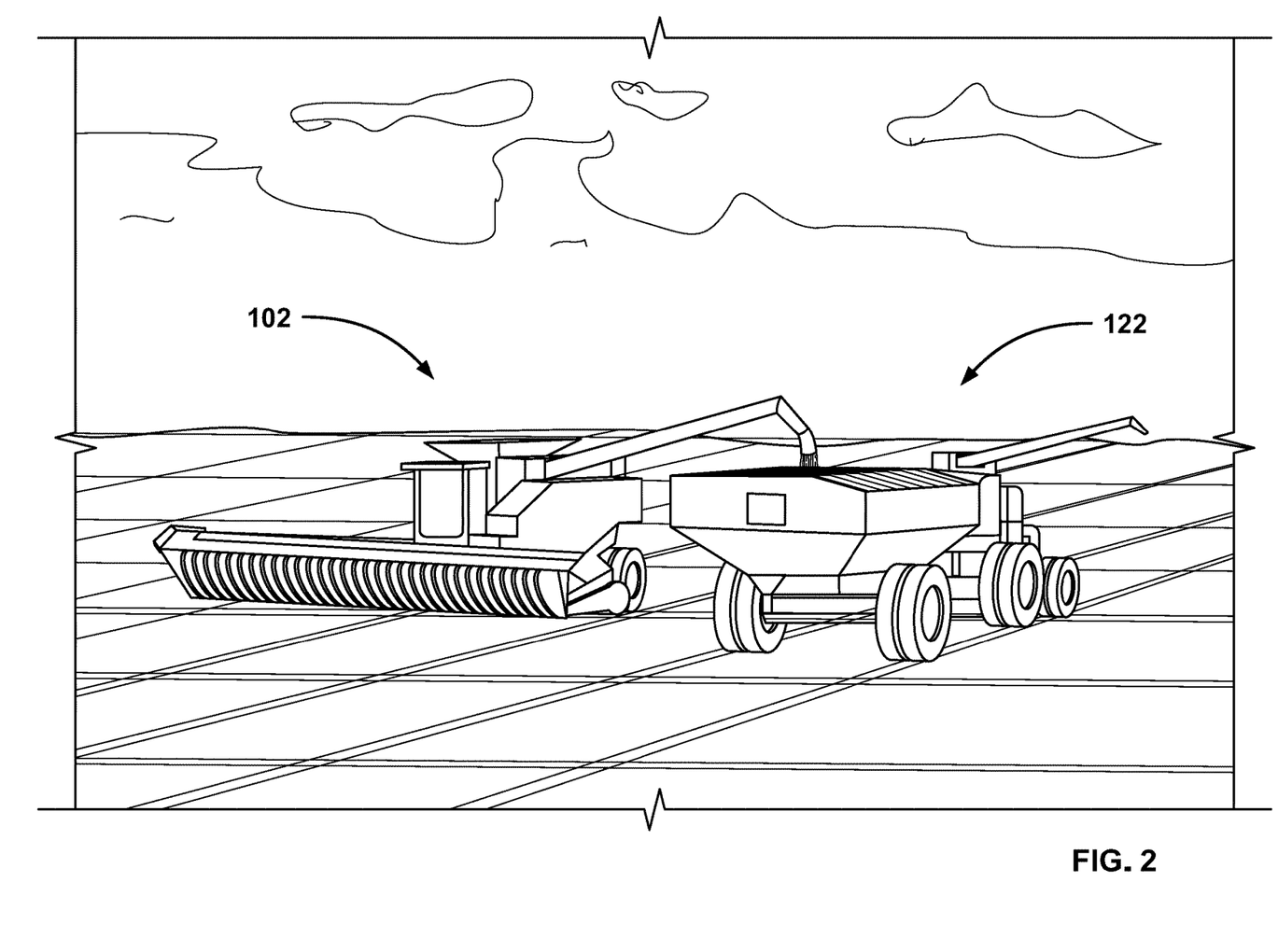
FIG. 2 shows a stationary combine harvester unloading harvested material to a stationary grain cart.

FIG. 2 shows stationary combine 102 unloading grain into stationary grain cart 122 located substantially adjacent to combine 102. In one embodiment, combine 102 unloads grain when it has harvested a specific amount of grain. In this embodiment grain cart 122 periodically travels to a location adjacent to combine 102 in order for combine 102 to unload grain into grain cart 122. It is common for farmers to leave grain carts at the side of the field that is being harvested. When a bin of combine 102 is holding a specific amount of grain, combine 102 operator will unload the grain (e.g., using an auger) from combine 102 to the grain cart 122. This process is an unload event for the combine and a load event for the grain cart. A single unload event from the combine can contain grain from multiple harvest passes through the field by the combine (e.g., combine 102, as shown in FIG. 1, travelling along path 101 in more than one direction, such as first direction indicated by arrow 104 and then second direction indicated by arrow 106 while harvesting grain). The number of harvest passes through the field per unload event will vary based on combine bin grain capacity and the yield level of the crop. It should be noted that a harvest pass could be less than a complete traversal of a field form end to end. For example, combine 102 may not be able to hold grain harvested in one pass of a field from end to end, but only a portion of that grain. In one embodiment, grain cart 122 has a plurality of sensors for sensing various parameters associated with the grain loaded into grain cart 122 such as a weight of grain and a volume of grain in grain cart 122. A grain cart that has a plurality of sensors for sensing various grain parameters is referred to as a smart grain cart.

Figure 3:
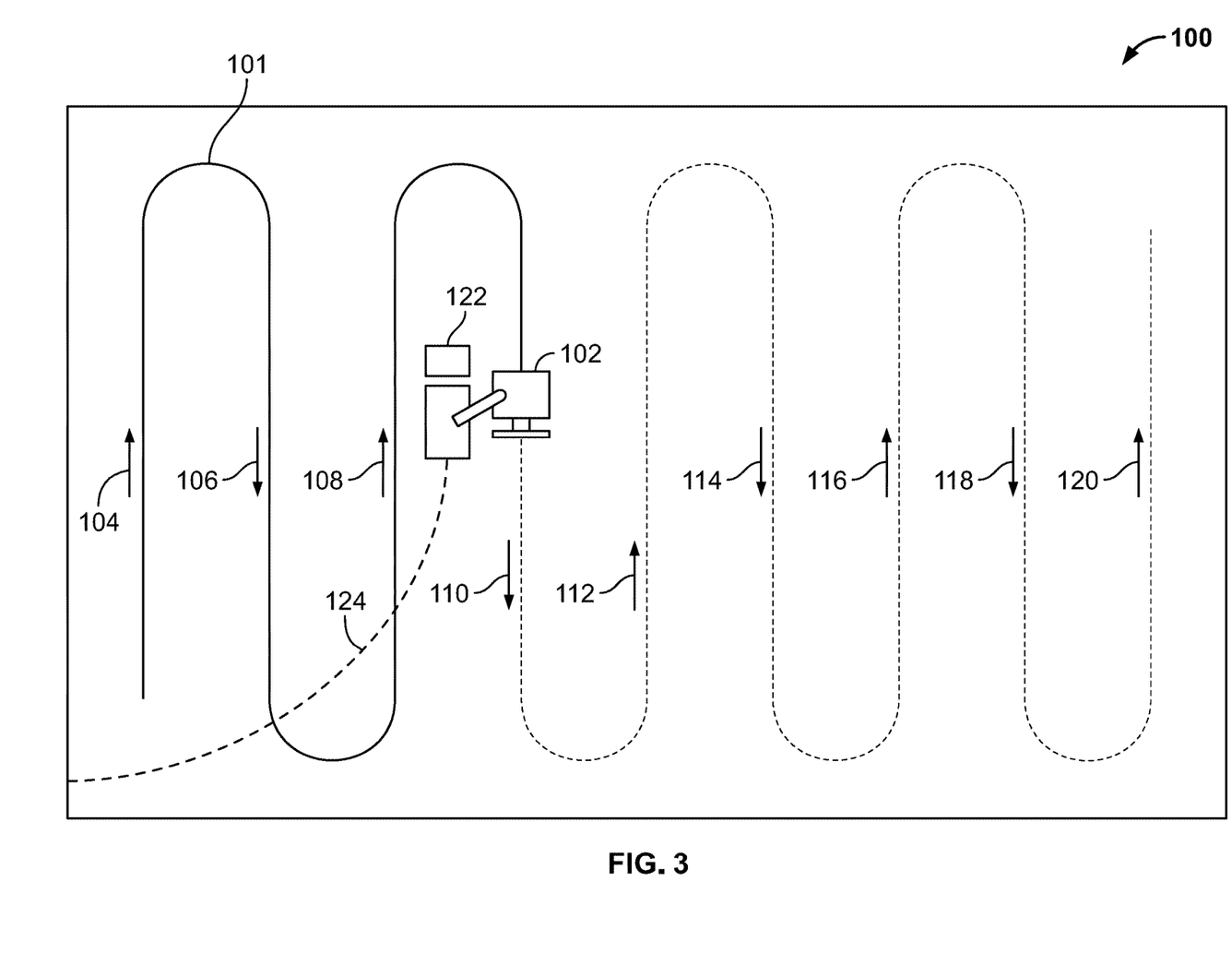
FIG. 3 shows a stationary combine harvester located in a field unloading harvested material to a stationary grain cart located in the field.

FIG. 3 shows grain cart 122 located adjacent to combine 102 which is unloading grain to grain cart 122. In one embodiment (not shown), grain cart 122 remains at an end of field 100 and combine 102 periodically travels to a location adjacent grain cart 122 to unload grain.

Figure 4:
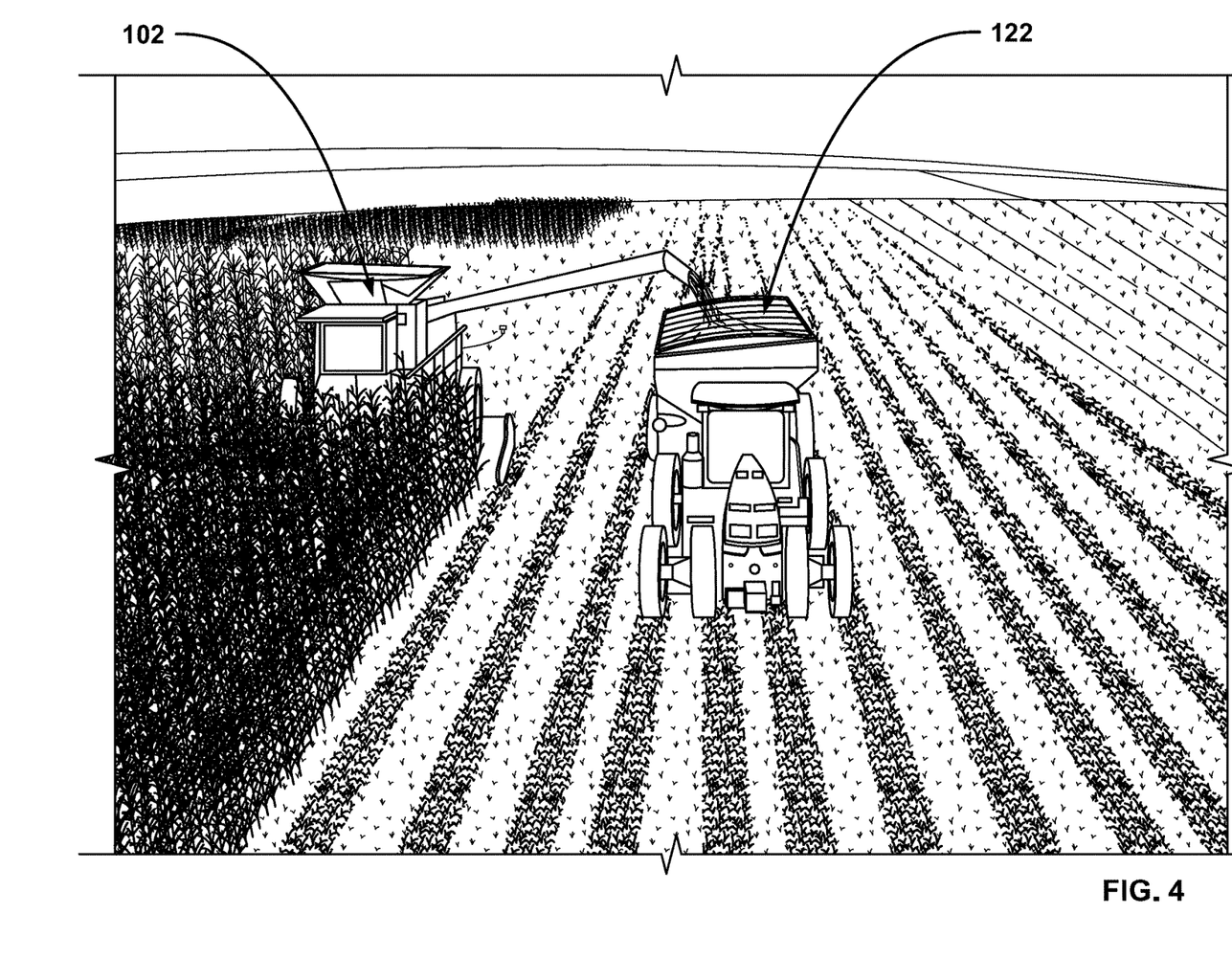
FIG. 4 shows a moving combine harvester unloading harvested material to a moving grain cart.

FIG. 4 shows moving combine 102 harvesting grain from a field with grain cart 122 moving adjacent to it. In one embodiment, grain cart 122 travels adjacent to combine 102 as it harvests grain. In this embodiment, combine 102 can unload grain to grain cart 122 whenever it is determined to be necessary. For example, combine 102 can unload grain to grain cart 122 when combine 102 has harvested a specific amount of grain. In one embodiment, combine 102 unloads grain to grain cart 122 as the grain is harvested by combine 102.

Figure 5:
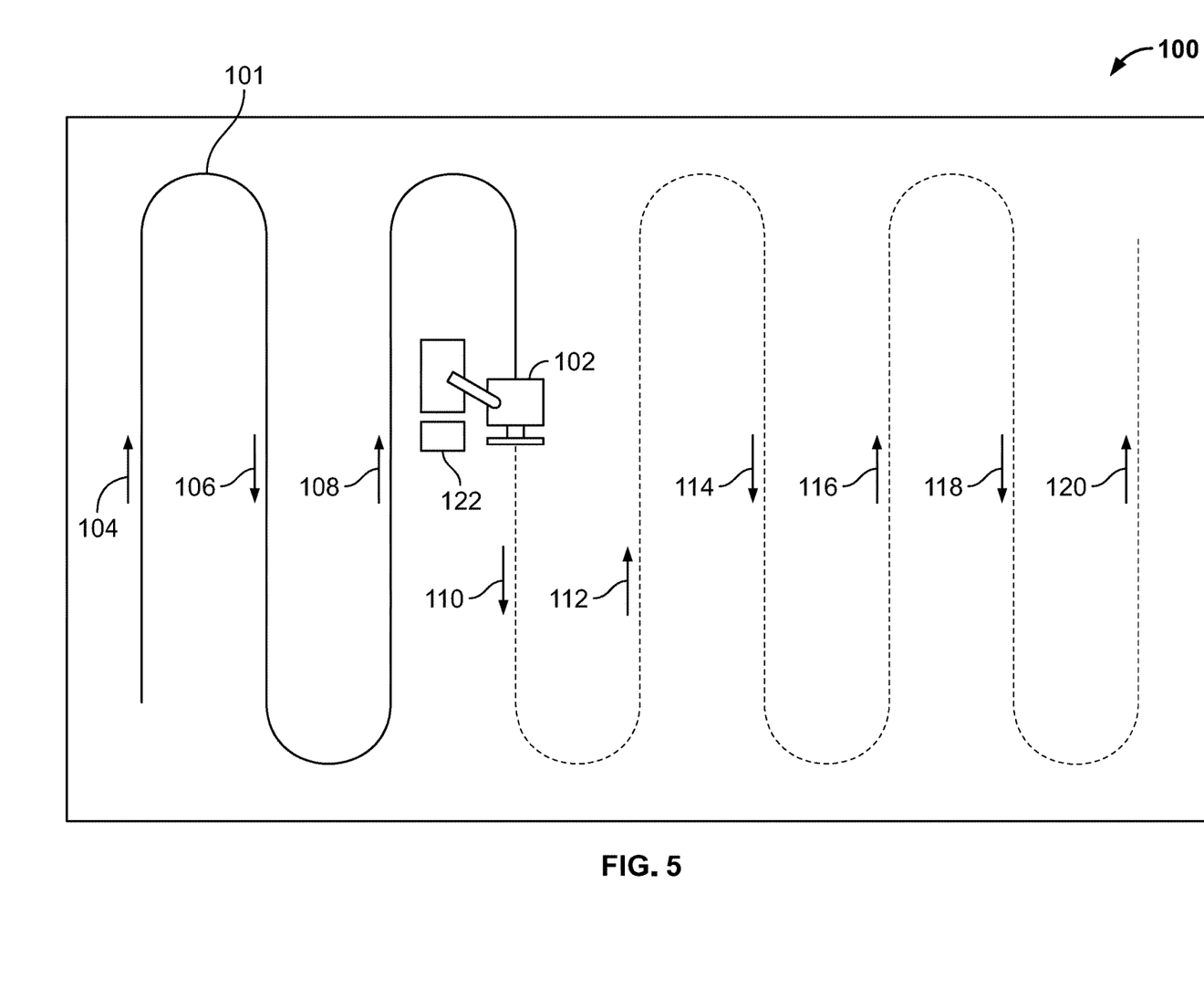
FIG. 5 shows a combine harvester moving in a field next to a grain cart moving adjacent to the combine harvester.

FIG. 5 shows moving combine 102 harvesting grain from field 100. In this embodiment, combine 102 unloads grain that has been harvested to moving grain cart 122 which is shown traveling adjacent to combine 102. This is referred to as "on-the-go" unloading.

In one embodiment, combine 102 has a plurality of sensors that are used to monitor how much grain is harvested from a field in order to determine the yield of the field (referred to commonly as yield monitoring). In one embodiment, yield monitor calibration is performed using information about grain that has been unloaded from combine 102 to grain cart 122. Yield monitor calibration can be performed using grain information received from grain cart 122 periodically when grain is unloaded from combine 102 to grain cart 122. Alternatively, data from a yield monitor of combine 102 and data from grain cart 122 can be transmitted to an enhanced yield server for determination of a yield of grain from a field after harvesting of grain has been completed. It should be noted that more harvest passes per unload event will result in a lower accuracy yield map compared to an unload event that contains less harvest passes.

Figure 6:
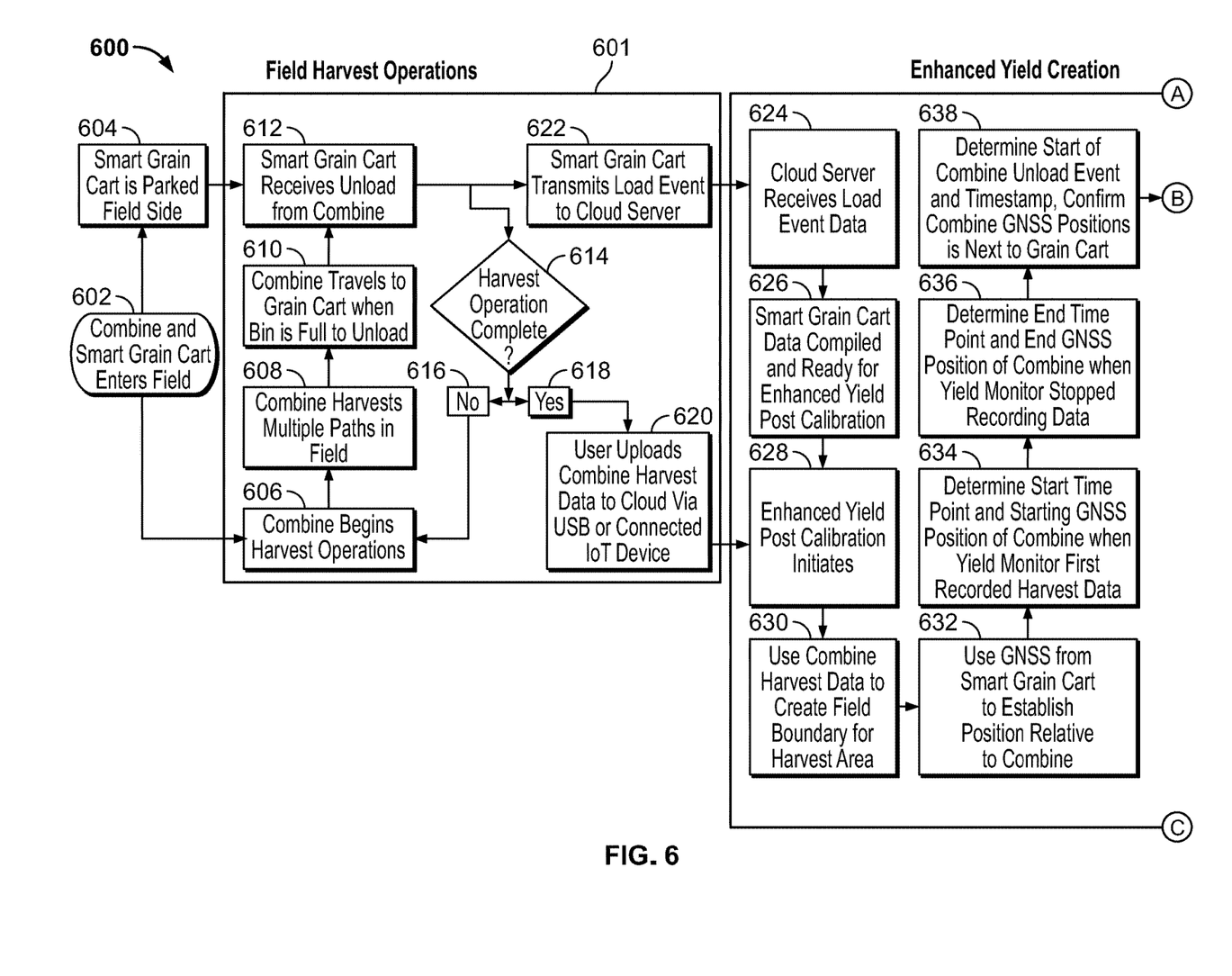
FIG. 6 shows a flowchart of a method for enhancing combine harvester yield data with stationary field-side grain cart data according to an embodiment.

FIG. 6 shows a flowchart 600 of the steps to create enhanced harvest yield data in an embodiment when a grain cart is used in a stationary manner as described in connection with FIGS. 2 and 3 above. Enhanced harvest yield data, in one embodiment, is yield data obtained by a yield monitor located on a combine that is collected and modified to more accurately describe the grain (e.g., weight, volume, size, moisture, etc.) harvested from a field. The steps of FIG. 6 shown in "Field Harvest Operations" 601 represent steps performed during field harvesting operations (i.e., combine 102 harvesting grain from a field and unloading grain from combine 102 to grain cart 122). The steps of FIG. 6 shown in "Enhanced Yield Creation" 603 represent post processing steps performed after field harvesting operations have been completed. The steps of enhanced yield creation 603 are described as occurring in a cloud server. However, a local server could alternatively perform those steps. Further, post processing can be performed at any time after sufficient data has been received to determine the desired information.

At step 602, combine 102 and smart grain cart 122 enter field 100. At step 604, smart grain cart 122 is parked field side so that it does not obstruct operation of combine 102. At step 606, combine 102 begins harvest operations (i.e., harvesting grain from field 100). At step 608, combine 102 harvests multiple paths in field 100. At step 610, combine 102 travels to grain cart 122 when a hopper (also referred to as a bin) is full or contains a specific amount of grain that is to be unloaded. At step 612, smart grain cart 122 receives grain unloaded from combine 102. At step 614 it is determined if the harvest operation is complete. If the harvest operation is not complete (branch "No" 616) the process proceeds to step 606 where combine 102 begins harvest operations in field 100 and repeats steps 608, 610, and 612. If the harvest operation is complete (branch "Yes" 618) the process proceeds to step 620 at which combine harvest data is uploaded to an enhanced yield server which, in this embodiment, is located in a data cloud. The enhanced yield server located in the data cloud is also referred to as a cloud server or a cloud. In one embodiment, a user uploads the combine harvest data to the data cloud via a universal serial bus (USB) device or a connected internet of things (JOT) device. In another embodiment, combine harvest data is transmitted wirelessly to the data cloud.

Returning to step 612 where the process proceeded to step 614, the process also proceeds to step 622. At step 622, grain cart 122 transmits load event data to the cloud server. At step 624, the cloud server receives the load event data from grain cart 122. At step 626, enhanced yield server compiles the received smart grain cart data for enhanced yield post calibration. At step 628, enhanced yield post calibration is initiated by the enhanced yield server.

At step 630, the combine harvest data uploaded at step 620 is used to create a field boundary for a harvest area by applying a multipoint polygon around the outer edge of the area covered by the combine harvesting operations represented by the geospatially tagged harvest data. At step 632, location data from a Global Navigation Satellite System (GNSS) of grain cart 122 is used to establish a position of grain cart 122 relative to combine 102. At step 634, a starting time point and starting GNSS position of combine 102 when a yield monitor first recorded harvest data is determined. At step 636, an end time point and end GNSS position of combine 102 when the yield monitor stopped recording data is determined. At step 638, a start time of a combine unload event is determined and timestamped and it is confirmed that the GNSS position of grain cart 122 adjacent to combine 102 at the start time of the unload event. At step 640, combine harvest data registering unload event timestamp is matched with matching timestamp of grain cart 122 new load event. At step 642, it is determined if an unload event is complete. In one embodiment, when grain cart 122 stops registering a load event and combine 102 starts recording new harvest data, the unload event is considered complete. At step 644, a new attribute titled "harvest event" is created to mark specific grain cart load events and their corresponding yield data from harvest passes through the field by the combine harvester so they can be matched and grouped. At step 646, analysis from steps 632, 634, and 636 is used to group harvest data points with a single grain cart load event based on the "Harvest Event" attribute which is determined in steps 638, 640, 642, and 644. "Harvest event" attribute will be tracked in specific groups in an increasing numeric order beginning with 1, i.e. Harvest Event 1, Harvest Event 2.

At step 648, a total grain yield weight is estimated from the yield monitor system within a specific harvest event by calculating the sum of estimated weight within the geospatial coverage area of the specific harvest event grouping, i.e. harvest event 1. At step 650, the total grain yield weight is calculated by a grain cart scale within the new harvest event group. At step 652, the total grain yield weight estimated by the yield monitor system is calibrated to match the grain cart total scale weight within the event group. At step 654, grain cart weight is zeroed at the completion of each harvest event group processing. This is to prevent the previous unload events from influencing new unload total weights. At step 656, steps 632 through 654 are repeated for all combine unload events and grain cart load events. At step 658 a new harvest layer titled "enhanced yield" with the grain cart weight calibrated yield monitor harvest data is created that adjusts yield monitor harvest data by harvest pass to match actual grain cart weights for their specific harvest event group.

Yield monitor calibration can alternatively be performed using grain information received from moving grain cart 122 as moving combine 102 unloads grain to moving grain cart 122 as shown in FIGS. 4 and 5.

Figure 7:
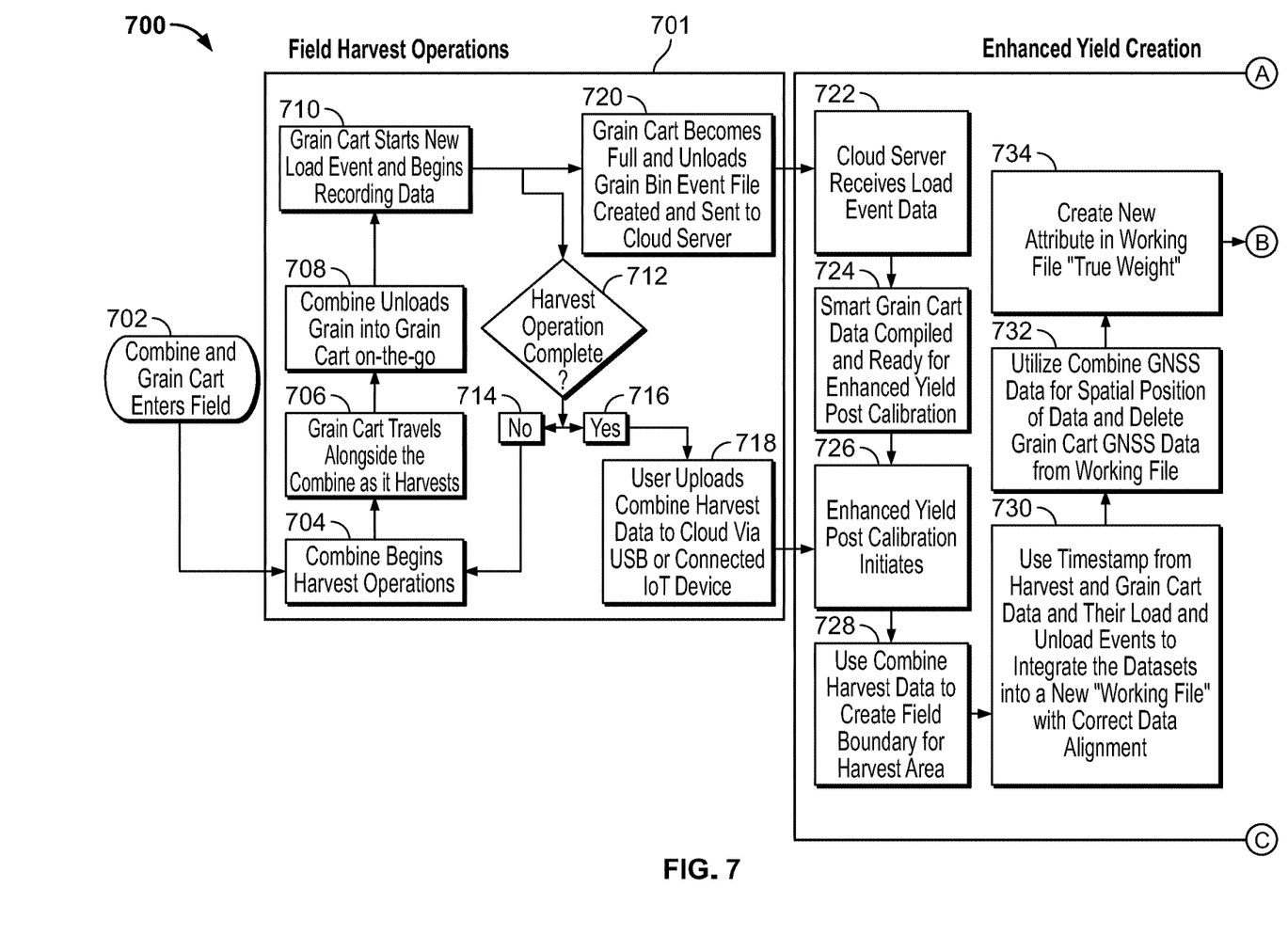
FIG. 7 shows a flowchart of a method for enhancing combine harvester yield data with grain cart data obtained from on-the-go harvester unloading operations according to an embodiment.

FIG. 7 shows the steps to create enhanced harvest yield data 700 in an embodiment when a grain cart travels adjacent to the combine while it harvests in the field and unloads directly into the grain cart on-the-go. This is very common for large farms and custom combine operations. The on-the-go unloading allows for the grain cart data to post calibrate every geotagged yield data point in the data file generated by the combine. For this reason, this embodiment of enhanced yield data will be more accurate as compared to the stationary grain cart embodiment described above. The steps of FIG. 7 shown in the box labeled "Field Harvest Operations" represent steps performed during field harvesting operations. The steps of FIG. 7 shown in the box labeled "Enhanced Yield Creation" represent post processing steps performed after field harvesting operations have been completed.

At step 702, combine 102 and grain cart 122 enter field 100. At step 704, combine 102 begins harvest operations in field 100. At step 706, grain cart 122 travels adjacent to combine 102 as it harvests. At step 708, combine 102 unloads grain to grain cart 122 "on-the-go". At step 710, grain cart 122 starts a new load events and begins recording data. At step 712, a decision is made based on whether the harvest operation is complete. If the harvest operation is not complete (branch "No" 714) the process proceeds to step 704 where combine 102 begins harvest operations in field 100 and repeats steps 706, 708, and 710. If the harvest operation is complete (branch "Yes" 716) the process proceeds to step 718 at which a user uploads combine harvest data to a cloud server. In one embodiment, the user uploads the combine harvest data to the enhanced yield server via a universal serial bus (USB) device or a connected internet of things (JOT) device.

Returning to step 710, the method also proceeds to step 720. At step 720, grain cart 122 becomes full and unloads its grain bin. An event file is created and sent to the cloud server. At step 722, the cloud server receives the event data pertaining to the load contained in grain cart 122. At step 724, grain cart load data is compiled to be used for enhanced yield post calibration. At step 726, enhanced yield post calibration is initiated using harvest data uploaded at step 718. At step 728, the combine harvest data uploaded at step 718 is used to create a field boundary for a harvest area. At step 730, a timestamp from harvest and grain cart data and their load and unload events are used to integrate datasets into a "working file" with correct data alignment. At step 732, combine location data for spatial position of data is utilized and grain cart location data is deleted from the working file. At step 734, a new attribute titled "true weight" is created in the working file. At step 736, within the true weight attribute, the true weight for each data point is determined by calculating the unload weight difference between unload data points. For example, a second unload weight minus a first unload weight equals a true weight. At step 738, a new grain cart file is created from the working file and is sent to the farm management information system that visualizes the data by placing the data points on a georeferenced map to represent their physical location and color coding them to visually show their numeric differences. The new grain cart file is also saved as a new completed task. At step 740, a new enhanced yield harvest file is created from the working file. At step 742, the enhanced yield harvest file is saved as a new complete task with enhanced yield labeling. At step 744, the enhanced yield file is visualized in the farm management information system for viewing by a user.

The result of the steps described above in connection with FIGS. 6 and 7 is the creation of a new harvest data layer with multiple "harvest event" groups calibrated by matching grain cart harvest events with geospatial granularity of the harvest data layer increasing by having more harvest event groups. The new harvest data layer will contain the enhanced yield labeling and will allow for improved visualization of yield information. The new enhanced yield harvest data layer will be accessible for export into other appropriate applications of agriculture management system.

It should be noted that the "on-the-go" methodology requires significant amount of processing to properly compensate for combine flow rate of grain through the auger and combine speed, as it unloads into the grain cart. This will have a significant effect on datapoint GNSS accuracy and prevent true Real Time Kinematic ("RTK") sub centimeter GNSS accuracy. Sub processes within steps shown in FIG. 7 have algorithms that calculate the auger flow rate by travel speed by time interaction to properly align all grain cart scale weights with the combine harvest data points. This will prevent the degradation of GNSS accuracy and incorrect data alignments and ensure proper quality of enhanced yield data for this embodiment with on-the-go operations.

Figure 8:
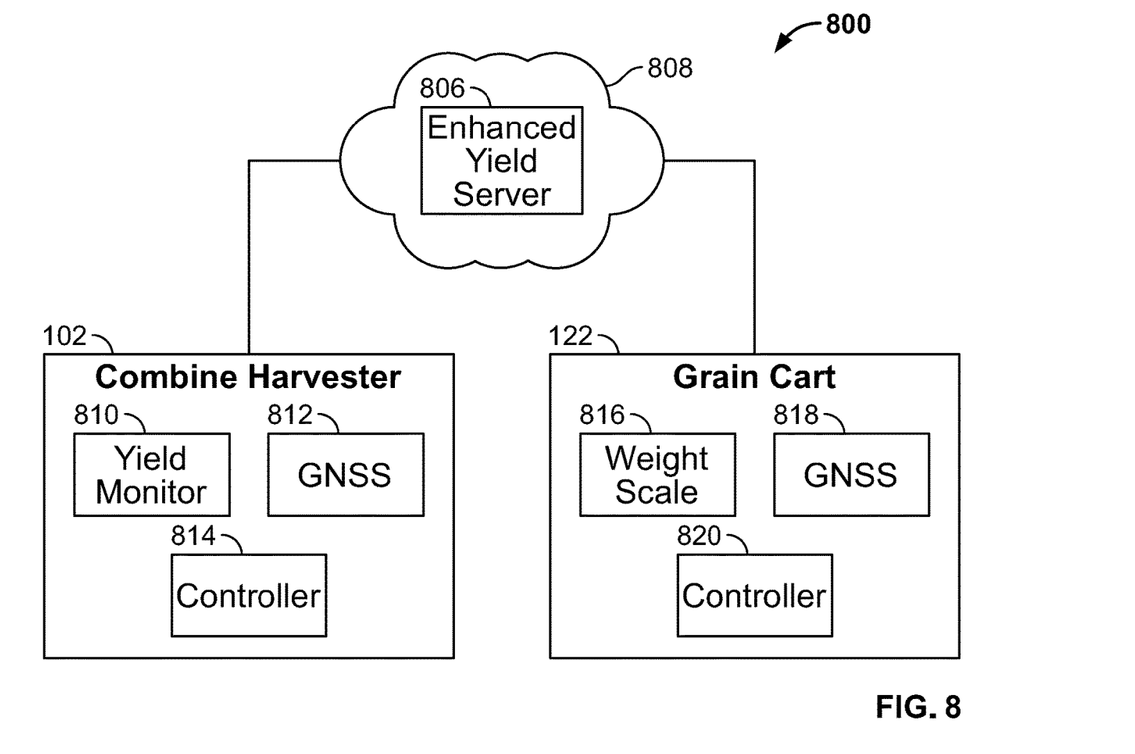
FIG. 8 shows a system for implementing a system for enhancing combine harvester data according to an embodiment.

FIG. 8 shows a representation of a system 800 for implementing an embodiment of the invention. System 800 includes a combine harvester 102, grain cart 122 and enhanced yield server 806 in the cloud 808. Cloud 808 represents any type of data network which provides for communication between combine harvester 102, grain cart 122 and enhanced yield server 806.

Combine harvester 102 includes: a yield monitor 810 for determining yield data of the harvested material; a global navigation satellite system (GNSS) 812 (e.g., GPS) for determining location information of the combine harvester 802 during the harvesting operation; and controller 814 for controlling operation of the yield monitor 810, GNSS 812, and certain other data processing operations of the combine harvester 102.

Grain cart 122 (also referred to as smart grain cart) includes: a weight scale 816 for determining weight data of the harvested material loaded into the grain cart 804 from the combine harvester 802; a GNSS 818 (e.g., GPS) for determining location information of the grain cart 804 during the harvesting operation; and controller 820 for controlling operation of the weight scale 816, GNSS 818, and certain other data processing operations of the grain cart 122.

Enhanced yield server 806 (also referred to as cloud server) may be implemented as a network server in the cloud 808 and is in communication with the combine harvester 102 and the grain cart 122 for post-processing (after the harvesting operation) data received from the combine harvester 102 and the grain cart 122 as described above in connection with FIGS. 6 and 7.

Figure 9:
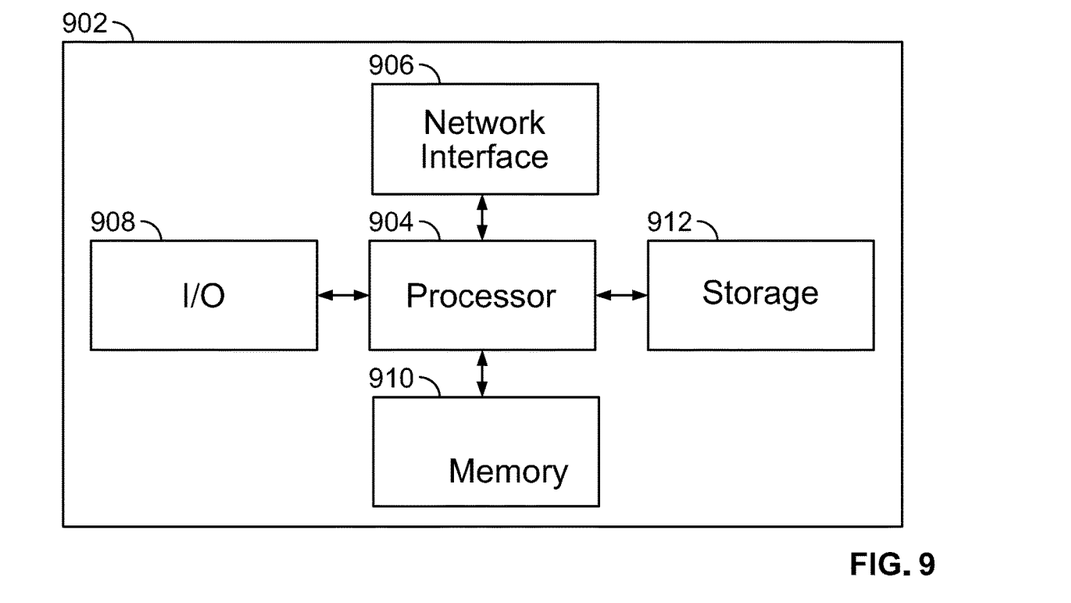
FIG. 9 shows a high level block diagram of a computer for implementing components of the system shown in FIG. 8 according to an embodiment.

In one embodiment, enhanced yield server 806 and controllers 814 and 820 can be implemented using computers. A high-level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium (e.g., magnetic disk, CD ROM, etc.), and loaded into memory 910 when execution of the computer program instructions is desired. Thus, the method steps of FIGS. 6 and 7 can be defined by the computer program instructions stored in the memory 910 and/or storage 912 and controlled by the processor 904 executing the computer program instructions. For example, the computer program instructions can be implemented as computer executable code on enhanced yield server 806 programmed by one skilled in the art to perform an algorithm defined by the method steps of FIGS. 6 and 7. Accordingly, by executing the computer program instructions, the processor 904 of enhanced yield server 806 executes an algorithm defined by the method steps of FIGS. 6 and 7. Processor of controller 814 can be configured to execute computer program instructions for executing appropriate algorithms for controlling operation of the yield monitor 810, GNSS 812, and certain other data processing operations of the combine harvester 102. Processor of controller 820 can be configured to execute computer program instructions for executing appropriate algorithms for controlling operation of the weight scale 816, GNSS 818, and certain other data processing operations of the grain cart 122. The computer 902 also includes one or more network interfaces 906 for communicating with other devices via a network. The computer 902 also includes input/output devices 908 that enable user interaction with the computer 902 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for processing geotagged harvest yield data comprising:
   receiving load data from a grain cart generated during harvesting operations;
   receiving geotagged harvest yield data from a combine harvester generated during the harvesting operations;
   processing the load data and the geotagged harvest yield data to generate enhanced yield data comprising the geotagged harvest yield data modified based on the load data; and
   creating a field boundary based on an outer edge of an area covered by the harvesting operations, the area based on the geotagged harvest yield data.

2. The method of claim 1, wherein the combine harvester and the grain cart operate in an on-the-go unloading harvest operation.

3. The method of claim 1, wherein the combine harvester and the grain cart operate in a stationary unloading harvest operation.

4. The method of claim 1, wherein the processing further comprises:
   determining a start time and start position for the combine harvester within the field boundary; and
   determining an end time and end position for the combine harvester within the field boundary.

5. The method of claim 4, wherein the processing further comprises:
   calculating a total grain yield weight estimated by a yield monitor of the combine harvester; and
   calculating a total grain yield weight estimated by a grain cart total scale weight.

6. The method of claim 5, wherein the processing further comprises:
   calibrating the total grain yield weight estimated by the yield monitor to match the grain cart total scale weight.

7. The method of claim 6, wherein the calibrating the total grain yield weight estimated by the yield monitor to match the grain cart total scale weight is performed for each unload event associated with the combine harvester and load event associated with the grain cart.

8. An apparatus comprising:
   a processor; and
   a memory to store computer program instructions, the computer program instructions when executed by the processor cause the processor to perform operations comprising:
   receiving load data from a grain cart generated during harvesting operations;
   receiving geotagged harvest yield data from a combine harvester generated during the harvesting operations;
   processing the load data and the geotagged harvest yield data to generate enhanced yield data comprising the geotagged harvest yield data modified based on the load data; and
   creating a field boundary based on an outer edge of an area covered by the harvesting operations, the area based on the geotagged harvest yield data.

9. The apparatus of claim 8, wherein the combine harvester and the grain cart operate in an on-the-go unloading harvest operation.

10. The apparatus of claim 8, wherein the combine harvester and the grain cart operate in a stationary unloading harvest operation.

11. The apparatus of claim 8, wherein processing further comprises:
    determining a start time and start position for the combine harvester within the field boundary; and
    determining an end time and end position for the combine harvester within the field boundary.

12. The apparatus of claim 11, wherein the processing further comprises:
calculating a total grain yield weight estimated by a yield monitor of the combine harvester; and
calculating a total grain yield weight estimated by a grain cart total scale weight.

13. The apparatus of claim 12, wherein the processing further comprises:
calibrating the total grain yield weight estimated by the yield monitor to match the grain cart total scale weight.

14. The apparatus of claim 13, wherein the calibrating the total grain yield weight estimated by the yield monitor to match the grain cart total scale weight is performed for each unload event associated with the combine harvester and load event associated with the grain cart.

15. A computer readable medium storing computer program instructions, which, when executed by a processor, cause the processor to perform operations comprising:
receiving load data from a grain cart generated during harvesting operations;
receiving geotagged harvest yield data from a combine harvester generated during the harvesting operations;
processing the load data and the geotagged harvest yield data to generate enhanced yield data comprising the geotagged harvest yield data modified based on the load data; and
creating a field boundary based on an outer edge of an area covered by the harvesting operations, the area based on the geotagged harvest yield data.

16. The computer readable medium of claim 15, wherein the combine harvester and the grain cart operate in an on-the-go unloading harvest operation.

17. The computer readable medium of claim 15, wherein the combine harvester and the grain cart operate in a stationary unloading harvest operation.

* * * * *